US006752531B2

(12) United States Patent
McWilliams

(10) Patent No.: US 6,752,531 B2
(45) Date of Patent: Jun. 22, 2004

(54) TEMPERATURE SENSOR

(75) Inventor: Kevin Ronald McWilliams, Stratford upon Avon (GB)

(73) Assignee: Ceramaspeed Limited (GB)

(*) Notice: Subject to any disclaimer, the term of this patent is extended or adjusted under 35 U.S.C. 154(b) by 0 days.

(21) Appl. No.: 10/239,368

(22) PCT Filed: Mar. 9, 2001

(86) PCT No.: PCT/GB01/01051

§ 371 (c)(1), (2), (4) Date: Apr. 16, 2003

(87) PCT Pub. No.: WO01/72088

PCT Pub. Date: Sep. 27, 2001

(65) Prior Publication Data

US 2003/0156621 A1 Aug. 21, 2003

(30) Foreign Application Priority Data

Mar. 23, 2000 (GB) ............................................ 0006898

(51) Int. Cl.[7] ............................ G01K 1/16; G01K 7/16; H05B 1/02

(52) U.S. Cl. ........................ 374/149; 374/141; 374/163; 374/208; 219/497; 219/452

(58) Field of Search ................................ 374/149, 141, 374/163, 208; 219/412–416, 497, 452

(56) References Cited

U.S. PATENT DOCUMENTS 3,664,193 A 5/1972 Nielseu ........................ 73/368
3,883,719 A * 5/1975 Hurko ...................... 219/466.1
3,987,275 A * 10/1976 Hurko ...................... 219/451.1
4,237,368 A * 12/1980 Welch .................... 219/448.17
4,447,710 A * 5/1984 McWilliams ........... 219/448.14
4,508,961 A * 4/1985 McWilliams ........... 219/448.11
4,868,371 A * 9/1989 Crossley et al. ....... 219/448.17
5,171,973 A * 12/1992 Higgins ................... 219/457.1
5,310,993 A * 5/1994 McWilliams et al. .. 219/448.19
5,919,385 A 7/1999 Kersten et al. .......... 219/448.1
5,961,867 A * 10/1999 McWilliams ............. 219/446.1
6,169,486 B1 * 1/2001 Berkcan et al. ............. 340/584
6,469,282 B1 * 10/2002 Roberts ....................... 219/481
6,580,058 B2 * 6/2003 Gratz et al. ............ 219/448.11
2001/0003335 A1 * 6/2001 Griffiths et al. .......... 219/446.1
2002/0088792 A1 * 7/2002 Bates et al. ............ 219/448.11

FOREIGN PATENT DOCUMENTS

GB 2171795 A 2/1986

OTHER PUBLICATIONS

Patent Abstract of Japan vol. 2000, No. 03, Mar. 30, 2000 Japanese Pulication No. 11337413 (Sukegawa Electric Co. Ltd) No Translation.
Patent Abstract of Japan vol. 013, No. 219, May 23, 1989 Japanese Publication No. 64 32492 (Agency of Ind. Science) No Translation.
Patent Abstract of Japan vol. 018, No. 018, Jan. 12, 1994 Japanese Publication No. 5 256704 (Toshiba Corp) No Translation International Search Report dated Apr. 12, 2001.

* cited by examiner

*Primary Examiner*—Gail Verbitsky
(74) *Attorney, Agent, or Firm*—Ira S. Dorman

(57) ABSTRACT

A temperature sensor (10) for use in a cooking appliance of the kind in which an electric heater (1) incorporating at least one heating element (5) is located behind a cooking plate (2). The temperature sensor is adapted to be located between the at least one heating element and the cooking plate. The sensor (10) comprises a sensing element (13) having an electrical parameter which changes as a function of temperature and a housing (12) for the sensing element. The housing has a first surface region (15) with high thermal radiation absorption relative to a second surface region (16). The sensor is adapted to be located with the first surface region (15) of the housing facing substantially towards the cooking plate (2) and the second surface region (16) facing substantially towards the at least one heating element (5).

25 Claims, 2 Drawing Sheets

FIG 1
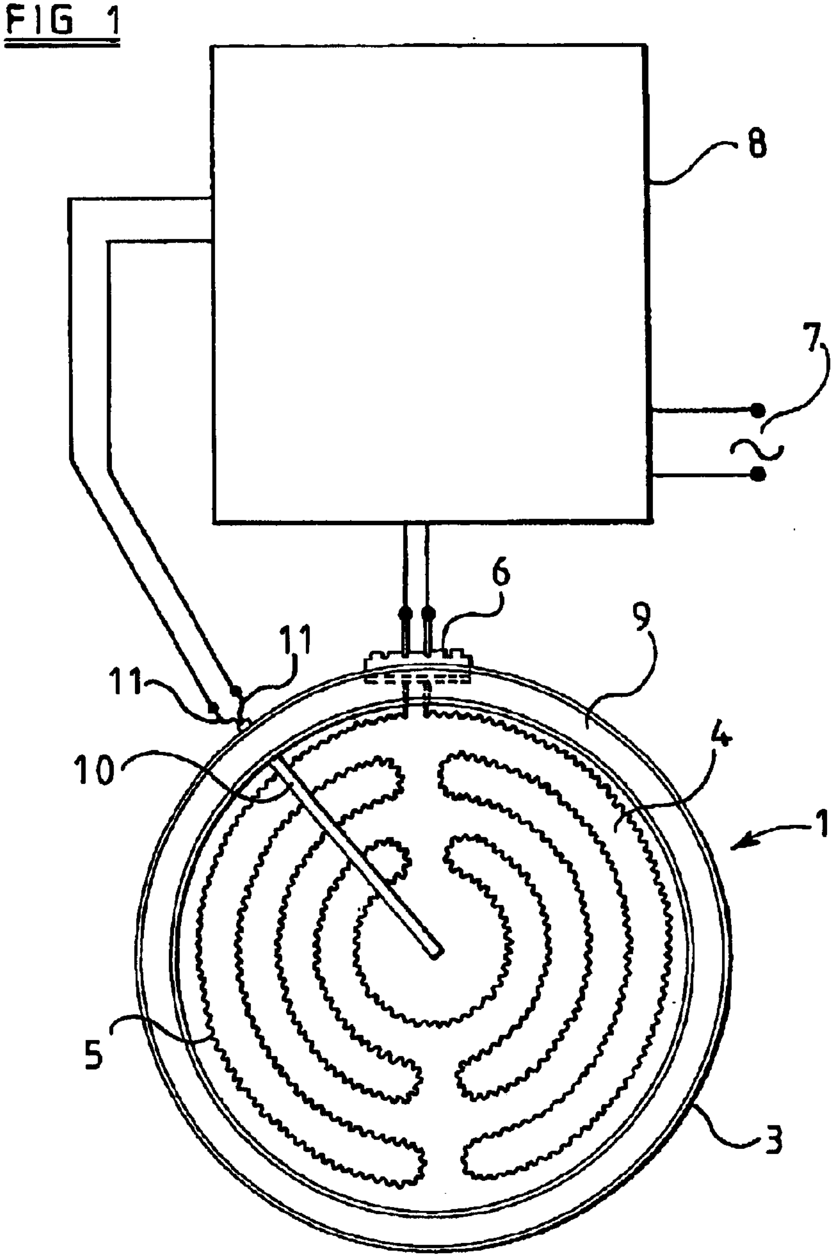
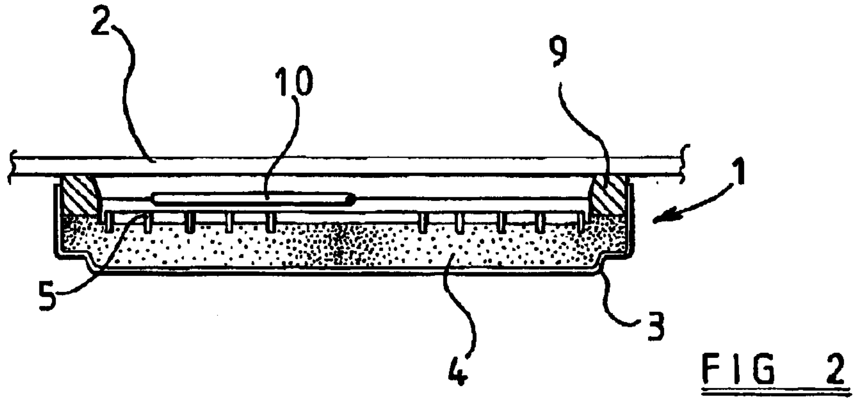
FIG 2

TEMPERATURE SENSOR

The present invention relates to a temperature sensor for use in a cooking appliance of the kind in which an electric heater incorporating at least one heating element is located behind a glass-ceramic sheet.

A temperature sensor is required in such heaters, which sensor is set to respond when the glass-ceramic reaches a predetermined temperature to de-energise the heater and prevent damage to the glass-ceramic which would otherwise occur if such predetermined temperature was to be exceeded for an extended period of time.

The most commonly used form of temperature sensor, generally referred to as a temperature limiter, comprises a rod assembled inside a tube, the rod having a significantly different coefficient of thermal expansion from the tube. The rod and tube are secured together at one end thereof and connected to a switch assembly at the other end. The device is arranged on the heater such that the rod and tube assembly is located between the heating element or elements in the heater and the glass-ceramic sheet. When the heater is operated, differential expansion occurs between the rod and tube and the device is tuned such that at a predetermined temperature the switch assembly is operated to de-energise the heater.

It is known to alter the sensitivity of the device to thermal radiation by forming the tube of a radiation reflecting or absorbing material, or by providing a reflecting coating on the surface of the tube. The arrangements of the prior art result in substantially uniform directional sensitivity to thermal radiation around the circumference of the tube.

Instead of the rod-in-tube differential expansion type of temperature limiter, temperature sensors have also been proposed in which a device having an electrical parameter which changes as a function of temperature is provided in the heater or in contact with the glass-ceramic sheet. The parameter is monitored such that, when a value thereof is obtained corresponding to a predetermined temperature of the glass-ceramic, the heater is arranged to be de-energised.

Such a temperature sensor when connected to suitable electronic control circuitry is capable of providing adaptive control of a heater with which the sensor is used and is advantageous over the rod-in-tube differential expansion type of device which is set to switch at a predetermined temperature selected under worst case abuse conditions of the heater.

The temperature sensor may comprise a device, for example, the electrical resistance of which changes with temperature, such as a platinum resistance temperature detector or a thermistor. Alternatively, the sensor may comprise a thermoelectric device, such as a thermocouple, providing a voltage output as a function of temperature.

It is therefore an object of the present invention to provide a temperature sensor of the type comprising a device having an electrical parameter which changes as a function of temperature and which exhibits preferential directional sensitivity to thermal radiation.

According to the present invention there is provided a temperature sensor for use in a cooking appliance of the kind in which an electric heater incorporating at least one heating element is located behind a cooking plate, the temperature sensor being for location between the at least one heating element and the cooking plate, the sensor comprising a sensing element having an electrical parameter which changes as a function of temperature and a housing for the sensing element, the housing having a first surface region thereof with high thermal radiation absorption relative to a second surface region thereof, the sensor being for location with the first surface region of the housing facing substantially towards the cooking plate and the second surface region facing substantially towards the at least one heating element.

The cooking plate may comprise a glass-ceramic sheet.

The housing may comprise a single component or a plurality of components and may be of generally tubular form, such as of substantially circular, rectangular or elliptical cross-section.

In one embodiment, the housing is provided with at least one surface layer to form the first and second surface regions.

When a first or second surface layer is provided to form the first or the second surface region, material comprising the housing may be selected and/or adapted to form a corresponding second or first surface region.

The first surface region of the housing may comprise, or be coated with, a material which has a higher thermal radiation emissivity, or a lower thermal radiation reflectivity, than a material which comprises, or with which is coated, the second surface region of the housing.

The housing may comprise a heat-resistant metal or alloy, such as a stainless steel, a first part of whose surface forms the first surface region, a second part of whose surface having thereon a coating of a material having higher thermal radiation reflectivity than the first surface region and constituting the second surface region. The material having the higher thermal radiation reflectivity may be selected from silver, gold and reflecting oxide material such as aluminium oxide.

Alternatively, the housing may comprise a heat-resistant metal or alloy, such as a stainless steel, a first part of whose surface forms the second surface region, a second part of whose surface having thereon a coating of a material having higher emissivity than the second surface region and constituting the first surface region. The material having the higher emissivity may comprise a heat-resistant black paint.

As a further alternative, the housing may comprise a ceramic material, a first part of whose surface forms the first or second surface region, a second part of whose surface having thereon a coating of a material having higher or lower reflectivity or emissivity than the ceramic material and constituting the corresponding second or first surface region.

The housing may comprise two parts, each such as of semi-cylindrical form, joined together and having different thermal radiation absorption properties, such that one part has higher or lower thermal radiation emissivity or reflectivity than the other, the two parts providing the first and second surface regions.

The sensing element in the housing may comprise a resistance temperature detector, such as a platinum resistance temperature detector, the electrical resistance of which changes as a function of temperature.

For a better understanding of the present invention and to show more clearly how it may be carried into effect reference will now be made, by way of example, to the accompanying drawings in which:

FIG. 1 is a plan view of a radiant electric heater provided with a temperature sensor according to the present invention and with a schematically-represented controller connected thereto;

FIG. 2 is a cross-sectional view of the heater of FIG. 1; and

Figure 3:
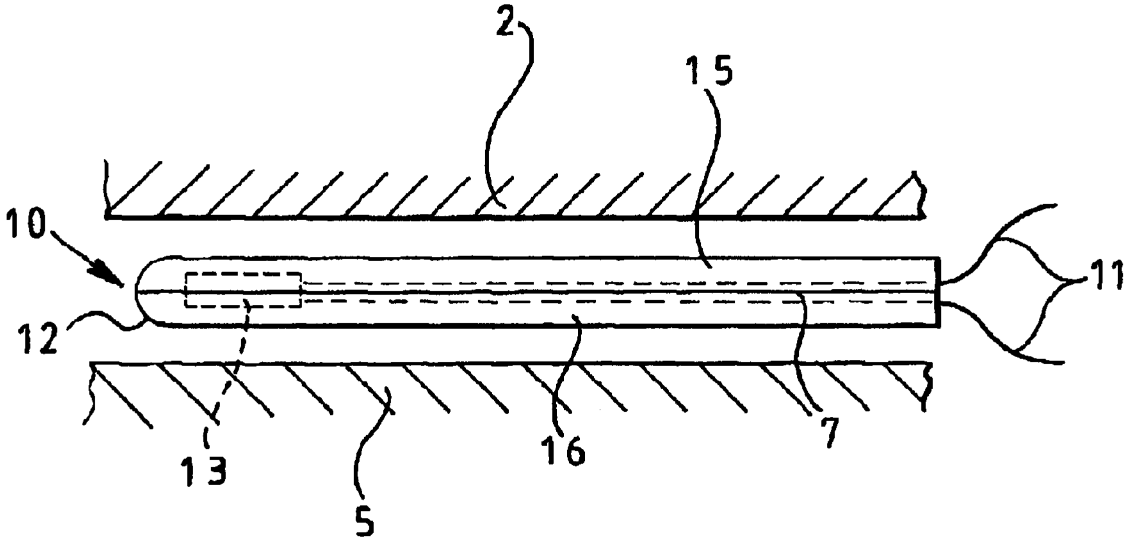
FIG. 3 is an enlarged side view of a temperature sensor according to the present invention shown schematically in the heater of FIG. 2.

Referring to FIGS. 1 and 2, a radiant electric heater 1 is provided for location behind a cooking plate 2, such as of glass-ceramic material. The heater 1 comprises a metal support dish 3 having therein a base layer 4 of thermal and electrical insulation material, such as microporous insulation material.

An electrical heating element 5 is supported on the base layer 4. As shown, a single heating element 5 is provided which comprises a corrugated metal ribbon supported edgewise on the base layer 4. However any other form of heating element could be considered and more than one heating element could be provided.

A terminal block 6, located at the edge of the dish 3, provides for electrical connection of the heating element 5 to a power supply 7 by way of a known form of controller 8, to enable the heating element 5 to be energised.

A peripheral wall 9 of thermal insulation material is arranged inside the edge of the dish 3 and has an upper surface contacting the cooking plate 2.

A temperature sensor 10, to be described in detail hereafter, has a rod-shaped housing which extends from an edge of the dish, through an aperture therein, and partially across the heater, such that the rod-shaped housing overlies the heating element 5 while being spaced therefrom. The temperature sensor 10 is arranged to provide a temperature-dependant electrical output to the controller 8, by way of connecting leads 11, whereby electrical energisation of the heating element 5 is controlled and particularly to ensure that the temperature of the cooking plate 2 does not exceed a predetermined safe level.

It is an important requirement that the temperature sensor 8 should follow the temperature of the cooking plate 2 in preference to being influenced by direct radiation from the heating element 5. In order to achieve this, the temperature sensor is constructed as shown in FIG. 3.

Referring to FIG. 3, the temperature sensor 10 comprises a tubular housing 12, inside which is located a sensing element 13 having an electrical parameter which changes as a function of temperature. The sensing element 13 may comprise a resistance temperature detector, such as a platinum resistance temperature detector, the electrical resistance of which changes as a function of temperature. Alternatively, the sensing element 13 could comprise a thermocouple or any other known device having an electrical parameter which changes appropriately as a function of temperature.

The sensing element 13 is provided with electrical leads 11 which extend from one end of the housing 12, the other end of the housing 12 being suitably closed. The leads 11 are arranged to be electrically connected to controller 8, which may be a microprocessor-based controller, as shown in FIG. 1.

The housing 12 is adapted in such a way that it has a first semi-cylindrical surface region 15 which faces substantially towards the cooking plate 2 and a second semi-cylindrical surface region 16 which faces substantially towards the heating element 5. It is arranged that the first surface region 15 exhibits high thermal radiation absorption relative to the second surface region 16. This means that thermal radiation radiating back from the underside of the cooking plate 2 is preferentially absorbed by the sensor 10 compared with radiation impinging directly on the sensor 10 from the heating element 5. The absorbed radiation results in a rise in temperature of the sensing element 13 and a corresponding change in the electrical parameter thereof, such as its electrical resistance, which is monitored by the controller 8. At a predetermined sensed temperature, the controller 8 operates to de-energise the heating element 5.

As a result of the invention, the temperature sensor 10 provides a more accurate response to the temperature of the cooking plate 2.

The required thermal radiation absorption characteristics of the first surface region 15 and the second surface region 16 of the housing 12 of the temperature sensor 10 can be provided in a number of ways.

For example, the housing 10 could comprise a tube of a heat-resistant metal or alloy, such as a stainless steel. A semi-cylindrical surface region of the material of the tube forms the first semi-cylindrical surface region 15 facing substantially towards the cooking plate 2. The remaining semi-cylindrical surface region of the tube is coated with a material having higher reflectivity, or lower absorption, or lower emissivity of thermal radiation than the surface region 15 and thereby providing the second semi-cylindrical surface region 16 facing substantially towards the heating element 5. A coating of reflective metal, such as silver or gold, or of a reflective oxide, such as aluminium oxide, may be provided to form the second surface region 16.

Instead of providing a coating to form the second surface region 16, such second surface region 16 could comprise a semi-cylindrical surface region of the metal or alloy material of the tube 10 and the first semi-cylindrical surface region 15 could comprise a coating of a material of lower reflectivity, or higher absorption, or higher emissivity, than the second surface region 16. A suitable such coating to form the first surface region is a heat resistant black paint.

The housing 10 could alternatively comprise a tube of ceramic material. A semi-cylindrical surface region of the ceramic material of the tube forms the first semi-cylindrical surface region 15 facing substantially towards the cooking plate 2. The remaining semi-cylindrical surface region of the ceramic tube is coated with a material having higher reflectivity, or lower absorption, or lower emissivity of thermal radiation than the surface region 15 and thereby providing the second semi-cylindrical surface region 16 facing substantially towards the heating element 5. A coating of a reflective metal, such as silver or gold, may be provided to form the second surface region 16.

Instead of providing a coating on the ceramic tube 10 to form the second surface region 16, such second surface region 16 could comprise a semi-cylindrical surface region. of the ceramic material of the tube 10 and the first semi-cylindrical surface region 15 could comprise a coating of a material of lower reflectivity, or higher absorption, or higher emissivity, than the second surface region 16. A suitable such coating to form the first surface region 15 is a heat resistant black paint.

Regardless of the nature of the material of the housing 10, for example whether it comprises a metal or a ceramic tube, both semi-cylindrical surface regions 15 and 16 could comprise coatings on the surface of the tube. A coating having high absorption of thermal radiation, such as a heat resistant black paint, could be provided as part of the surface of the tube to form the first semi-cylindrical surface region 15 and a coating having high reflectivity of thermal radiation, such as silver or gold, or a reflecting metal oxide, could be provided as the remainder of the surface of the tube, to form the second semi-cylindrical surface region 16.

It will be obvious to the skilled person that the tube used to form the housing 10 need not be cylindrical, with a circular cross-section, but could have other cross-sectional forms such as elliptical or rectangular forms. Such forms are indistinguishable in FIG. 3 and separate illustrations thereof are not practicable or required.

It would also be possible to provide the housing 10 of two parts having different thermal radiation absorption or reflection properties. Each part could be of semi-cylindrical or like form, providing the surface regions 15 and 16 in FIG. 3 and secured together at region 17.

What is claimed is:

1. A temperature sensor (10) for use in a cooking appliance of the kind in which an electric heater (1) incorporating at least one heating element (5) is located behind a cooking plate (2), the temperature sensor being for location between the at least one heating element and the cooking plate, the sensor comprising a sensing element (13) having an electrical parameter which changes as a function of temperature and a housing (12) for the sensing element, wherein the housing (12) has a first surface region (15) thereof with high thermal radiation absorption relative to a second surface region (16) thereof, the sensor (10) being for location with the first surface region (15) of the housing facing substantially towards the cooking plate (2) and the second surface region (16) facing substantially towards the at least one heating element (5).

2. A temperature sensor as claimed in claim 1, wherein the cooking plate (2) comprises a glass-ceramic sheet.

3. A temperature sensor as claimed in claim 1, wherein the housing (12) comprises a single component.

4. A temperature sensor as claimed in claim 1, wherein the housing (12) comprises a plurality of components.

5. A temperature sensor as claimed in claim 1, wherein the housing (12) is of generally tubular form.

6. A temperature sensor as claimed in claim 5, wherein the housing (12) has a cross-section selected from circular, rectangular and elliptical cross-sections.

7. A temperature sensor as claimed in claim 1, wherein the housing (12) comprises two parts joined together and having different thermal radiation absorption properties, such that one part has different thermal radiation emissivity or reflectivity than the other, the two parts providing the first and second surface regions (15, 16).

8. A temperature sensor as claimed in claim 7, wherein the two parts of the housing (12) are each of semi-cylindrical form.

9. A temperature sensor as claimed in claim 1, wherein the sensing element (13) in the housing (12) comprises a resistance temperature detector, the electrical resistance of which changes as a function of temperature.

10. A temperature sensor as claimed in claim 9, wherein the resistance temperature detector comprises a platinum resistance temperature detector.

11. A temperature sensor as claimed in claim 1, wherein the housing (12) is provided with at least one surface layer to form at least one of the first and second surface regions (15, 16).

12. A temperature sensor as claimed in claim 11, wherein the housing (12) comprises a ceramic material, a first part of whose surface forms one of the first and second surface regions, a second part of whose surface having thereon a coating of a material having a material property selected from higher and lower reflectivity or emissivity than the ceramic material and constituting the corresponding surface region selected from the second and first surface regions.

13. An electric heater incorporating a temperature sensor (10) as claimed in claim 1.

14. A temperature sensor as claimed in claim 11, wherein the housing is provided with a surface layer to form one of the first and second surface regions (15, 16) and material comprising the housing is adapted to form the other of the second and first surface regions (16, 15).

15. A temperature sensor as claimed in claim 11, wherein the first surface region (15) of the housing comprises a material which has a higher thermal radiation emissivity, or a lower thermal radiation reflectivity, than a material with which is coated the second surface region (16) of the housing (12).

16. A temperature sensor as claimed in claim 11, wherein the first surface region (15) of the housing is coated with a material which has a higher thermal radiation emissivity, or a lower thermal radiation reflectivity, than a material with which is coated the second surface region (16) of the housing (12).

17. A temperature sensor as claimed in claim 11, wherein the first surface region (15) of the housing is coated with a material which has a higher thermal radiation emissivity, or a lower thermal radiation reflectivity, than a material which comprises the second surface region (16) of the housing (12).

18. A temperature sensor as claimed in claim 11, wherein the first surface region (15) of the housing comprises a material which has a higher thermal radiation emissivity, or a lower thermal radiation reflectivity, than a material which comprises the second surface region (16) of the housing (12).

19. A temperature sensor as claimed in claim 18, wherein the housing (12) comprises a material selected from a heat-resistant metal and alloy, a first part of whose surface forms the second surface region (16), a second part of whose surface having thereon a coating of a material having higher emissivity than the second surface region and constituting the first surface region (15).

20. A temperature sensor as claimed in claim 19, wherein the material having the higher emissivity comprises heat-resistant black paint.

21. A temperature sensor as claimed in claim 18, wherein the housing (12) comprises a material selected from a heat-resistant metal and alloy, a first part of whose surface forms the first surface region (15), a second part of whose surface having thereon a coating of a material having higher thermal radiation reflectivity than the first surface region and constituting the second surface region (16).

22. A temperature sensor as claimed in claim 21, wherein the alloy comprises stainless steel, a first part of whose surface forms the first surface region (15), a second part of whose surface having thereon a coating of a material having higher thermal radiation reflectivity than the first surface region and constituting the second surface region (16).

23. A temperature sensor as claimed in claim 21, wherein the material having the higher thermal radiation reflectivity is selected from silver, gold and reflecting oxide material.

24. A temperature sensor as claimed in claim 23, wherein the reflecting oxide material is aluminium oxide.

25. A temperature sensor as claimed in claim 11, wherein the housing (12) is provided with a surface layer to form one of the first and second surface regions (15, 16) and material comprising the housing is selected to form the other of the second and first surface regions.

* * * * *